(12) United States Patent
Bryant et al.

(10) Patent No.: US 6,249,358 B1
(45) Date of Patent: Jun. 19, 2001

(54) METHOD OF SCANNING PHOTOGRAPHIC FILM IMAGES USING SELECTIVELY DETERMINED SYSTEM RESPONSE GAIN CALIBRATION

(75) Inventors: Steven M. Bryant, Holley; John T. Compton, LeRoy, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/219,047

(22) Filed: Dec. 23, 1998

(51) Int. Cl.$^7$ .................................................. H04N 1/40
(52) U.S. Cl. ..................................... 358/461; 250/208.1
(58) Field of Search .................................... 358/461, 448, 358/455; 250/214 AG, 208.1

(56) References Cited

U.S. PATENT DOCUMENTS

| | | | |
|---|---|---|---|
| 5,130,822 | 7/1992 | Nagata et al. | 358/461 |
| 5,267,053 | 11/1993 | Potucek et al. | 358/446 |
| 5,371,613 | 12/1994 | Arimoto et al. | 358/461 |
| 5,563,723 | 10/1996 | Beaulieu et al. | 358/461 |
| 5,644,409 | 7/1997 | Irie et al. | 358/461 |
| 5,659,488 | 8/1997 | Yamanoue | 358/461 |
| 6,180,935 | * 1/2001 | Hoagland | 250/208.1 |

FOREIGN PATENT DOCUMENTS 00-228726  *  8/2000  (JP) ............................... H04N/1/407

* cited by examiner

*Primary Examiner*—Jerome Grant, II
(74) *Attorney, Agent, or Firm*—Francis H. Boos, Jr.

(57) ABSTRACT

Gain factors for correcting pixel to pixel variations in system response in a multi-pixel scanner array are determined by calculating gain factors for a so-called "open gate" condition (with no film present), by calculating gain factors for a so-called "Dmin" condition (looking at the minimum density of the film), and by selectively combining the "open gate" gains and "Dmin" gains to create composite set of gain factors which overcome the shortcomings of using either original set of gains alone. The composite gain factors can be a proportional sum of the two original sets of gains with the proportionality changing on a pixel-by-pixel basis to select more of one set of gains or the other set of gains. A number of discriminating functions are disclosed which may be used to calculate the proportionality based on some understanding of how the presence of film changes the characteristics of the scanning system.

6 Claims, 7 Drawing Sheets

METHOD OF SCANNING PHOTOGRAPHIC FILM IMAGES USING SELECTIVELY DETERMINED SYSTEM RESPONSE GAIN CALIBRATION

FIELD OF THE INVENTION

This invention relates generally to photographic film image scanners, and in particular to the use of selectively determined system response gain correction factors.

BACKGROUND OF THE INVENTION

In a typical scanning system for producing an electronic representation of visual material, the subject is illuminated by some light source and a resulting image is projected by a lens onto a photosensor (imager) to produce an electrical signal which is proportional to the brightness of the image. This electrical signal is typically converted to a digital representation for display and manipulation using a computer. For example, a charge coupled device (CCD) imager contains an array of light detecting sites (photosites) which accumulate charge depending on the light energy projected onto them. After some charge accumulation time, the charges in the photosites are transferred to a charge shifting structure so that the charges may be shifted out of the CCD and measured by some means in order to form an electronic representation of the image projected onto the CCD. Because of factors such as manufacturing variability in the CCD, dust or contaminants in the scanner optical imaging path, light source non-uniformity, or other source of variation, the system response for individual photosites may not be the same from site to site. Some means of compensation for this site to site variation is required so that the resulting electronic representation is not affected by the particular variation.

If the response of a given array of photosites to light energy is modeled as an offset representing the response when no light is present and as a proportionality constant which represents the effectiveness of the photosite when light is present, then that photosite may be normalized to a nominal responsiveness by subtracting the offset from the original signal and multiplying the result by the inverse of the proportionality constant. The inverse of the proportionality constant is referred to as gain. If an offset and gain are determined for each of the photosites in the imager array and if these offsets and gains are applied to the corresponding photosites each time the photosite outputs are measured or read, then the responsiveness of all the photosites will appear to be equal.

Typically, the system response for a given photosite does not change in the short term. Hence, the gain and offset values required to adjust the system response for a given photosite back to some ideal response can be determined by a calibration process at one time and then applied whenever the signal for that photosite is measured at some later time. A typical calibration process obtains samples of the system response for each photosite at two nominal signal input levels (using a white and a black card or using full illumination and dark, for example) at some nominal gain and offset values (typically 1 and 0, respectively) and then calculates the necessary gain and offset correction values for each of the photosites.

Offset correction is utilized in a practical scanner in order to account for inevitable small signals which arise even in the absence of light. The offset correction values are also referred to as dark offset correction. The offset correction values are subtracted on a pixel-by-pixel basis from the signal obtained from the image scanning system in order to make the result "zero based", i.e., zero signal for zero light.

Gain correction is used in a scanner in order to account for inevitable variations in the light responsivity of the scanner on a pixel-by-pixel basis. Typically, the gain is the inverse (in a proportional sense) of the offset corrected signal from a uniformly white or gray image in the case of a reflection scanner, or a clear or minimum density (Dmin) piece of film in the case of a transmission scanner. Assuming that the system responds in a straight line fashion (i.e., the proportionality between the offset corrected signal and the illumination level is the same at all illumination levels), then multiplying each offset corrected pixel by its associated gain will normalize all the pixel responses to a common value.

The concepts and practices of determining gains and offsets on a pixel-by-pixel basis during calibration phase and employing those gains and offset during a later scanning phase in order to compensate for pixel-by-pixel variations in system responsiveness is well known in the art. U.S. Pat. No. 5,563,723—Beaulieu et al describes an approach to determining pixel-by-pixel gains and offsets, for example.

In the case of a negative film scanner, it is common practice to collect scan data without film (a so-called "open gate" condition) in order to determine the pixel-by-pixel gains. Although determining the pixel-by-pixel gains by collecting scan data through the Dmin of the film may be closer to the desired "white card" condition of maximum light from the subject material to be scanned, it leaves the gain determination process susceptible to scratches, dust, fogged or exposed areas and other imperfections in the selected Dmin area of the film which may corrupt the resulting gain values and consequently induce artifacts in the resulting electronic image. Open gate gain determination avoids the problems of these imperfections. However, the difference in overall illumination between open gate and Dmin must be taken into account. This can be done by reducing the illumination level or the exposure (integration) time for the open gate scan in order to yield the same average signal as a Dmin scan. The concept of determining pixel-by-pixel gains using an "open gate" condition is well known in the art, as demonstrated also by the above-mentioned '723 patent which describes a method for determining open gate gain correction factors.

Open gate calibration for a negative film scanner has been found to work well for large scale non-uniformities in the system response, such as the general fall-off of illumination that is typically seen toward the edges of the illumination source. However, it has been found that narrow, sharp non-uniformities in the illumination source are not corrected as well and show up as streaks in the subsequently scanned images. Things that can cause such narrow, sharp non-uniformities are dust particles at the film end of the illumination source or a small dark particle embedded in the film end of the light diffuser. If open gate derived gain correction factors are applied to the open gate scan data, the result will be uniform response across the scan. Similarly, if Dmin derived gain correction factors are applied to image scan data, the result is a fairly uniform photosite response over all image densities. This assumes that no localized imperfections were detected in the film Dmin area during the derivation of Dmin gain correction factors. If such localized imperfections are detected during the Dmin scan, they will have an effect on the Dmin gain correction factors which will show up as streaks on the resulting image reproduced from the image scan data even though no streaks exist in the film in the image frame area. However, if open gate gain factors are applied to image data rather than Dmin gain factors, it has been found that narrow, sharp non-uniformities resulting from anomalies, e.g. hair or dust particles, in the optical imaging path are not corrected properly in the resulting image data and show up as streaks in images produced from such image data. When the open gate gains are compared to the Dmin gains, the Dmin gains have relatively lower peaks in the areas of narrow, sharp illumination non-uniformities. There is a difference between open gate gain correction and Dmin gain correction which is not accurately described by a pure gain and offset model.

In summary, in a film (transmission) scanning system there has been found to be some differences in system response characteristics between a so-called "open gate" condition (which is ideal for determining pixel-by-pixel gains and offsets) and the "film present" condition when actual image scanning is taking place. It is an object of the present invention, therefore, to provide a method for adjusting gain correcting factors applied during image scan operation that takes these differences into account and provides for improved system response characteristics during image scan operations.

SUMMARY OF THE INVENTION

Therefore, in accordance with the invention, there is provided a method of performing gain calibration in a film scanner to correct for pixel-by-pixel variations in scanning system response, wherein the method comprises:

a. obtaining a pixel-by-pixel open gate response for the scanning system in which scanning illumination is active but without film present in the scanning system;

b. establishing a pixel-by-pixel open gate gain profile in response to said open gate response;

c. obtaining a pixel-by-pixel Dmin response for the scanning system in which scanning illumination is active and film is present in the scanning system;

d. establishing a pixel-by-pixel Dmin gain profile in response to said Dmin response e. establishing a pixel-by-pixel composite gain profile from selective combination of said open gate and Dmin gain profiles; and f. on a pixel-by-pixel basis utilizing the composite gain profile for actual scanning of film images.

In a preferred form of the invention, the composite gain profile is selected primarily from values in the open gate profile with values from the Dmin gain profile being selected for a pixel or range of pixels in which Dmin gain correction provides more accurate scanning output response. In another preferred form of the invention, the values of composite gain profile for one or more pixels are comprised of proportionate contributions of open gate and Dmin gain profile values.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the drawings:

FIG. 5 is a schematic representation of a method for determining the pixel-by-pixel proportionality K used to combine the open gate gains and Dmin gains in FIG. 4.

DETAILED DESCRIPTION OF THE INVENTION

Figure 1:
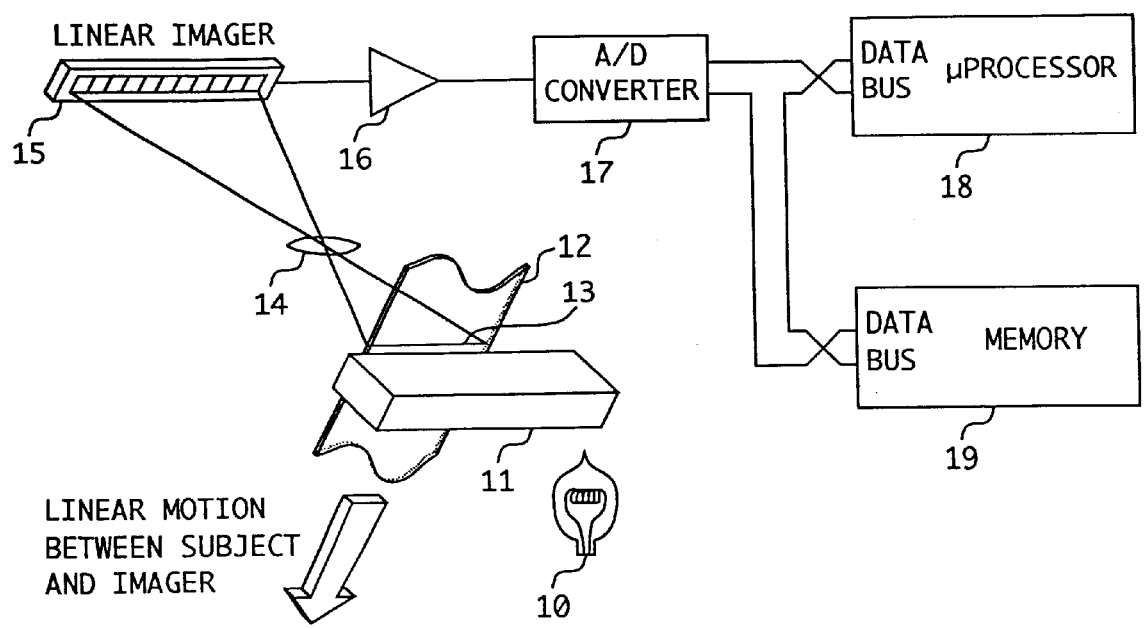
FIG. 1 is a block diagram schematic for a CCD based linear imaging scanner useful in the practice of the present invention.

FIG. 1 shows a typical arrangement of circuit elements in a CCD-based linear transmission (or film) scanner with which the gain determination method of the present invention may be suitably practiced. In this particular arrangement the application of gain and offset factors to correct for pixel to pixel variations in system response are applied by the microprocessor 18 to digital data collected from the A/D converter 17; other scanning systems have been described in which the gains and offsets are applied to the analog signal prior to the A/D converter (ref. U.S. Pat. No. 5,563,723—Beaulieu et al) or in which the gains and offsets are applied to the digital output of the A/D converter by specialized hardware. The present invention may be practiced with any of these arrangements but may be suitably described in the context of the simple scanning system shown in FIG. 1.

In FIG. 1, the light source 10 provides light to diffuser 11 which is intended to provide a relatively uniform light source to the linear area to be scanned 13. Film 12 intended to be scanned is placed at one point of focus of a lens 14, and a linear imager 15 is placed at the other point of focus of the lens. Amplifier 16 increases the signal strength of the signal coming from the imager, and the A/D converter 17 converts the analog output of the amplifier into digital data which may be read from the A/D converter by microprocessor 18 and placed into a memory device 19 for further processing. Timing and control means for clocking the signal out of the imager and for synchronizing the operation of the A/D converter with the imager signal are not shown in this figure, but are well understood in the art and are not necessary for the description of the present invention.

In FIG. 1, there are a number of places in which pixel to pixel variations in system response may arise. The illumination source (the combination of the light source 10 and the diffuser 11) may not be entirely uniform from end to end. Indeed, in practical illumination sources such as the one shown there is typically a falloff of light intensity from the middle of the diffuser to both ends. Furthermore, imperfections in the diffuser (dark particles embedded in the film end of the diffuser, non-uniformities in the distribution of diffusing material within the body of the diffuser, dirt, dust, or fibers accumulating at the film end of the diffuser) may add localized illumination non-uniformities which contribute to system pixel to pixel variations. The imager 15 itself typically has pixel to pixel variations in both dark signal level (the signal level representing the no light or black condition) and responsiveness to light. These variations together combine to create a system response which may be measured and compensated by applying, on a pixel-by-pixel basis, offsets to correct for variations in dark signal level and gains to correct for variations in illumination and pixel responsiveness.

Figure 2:
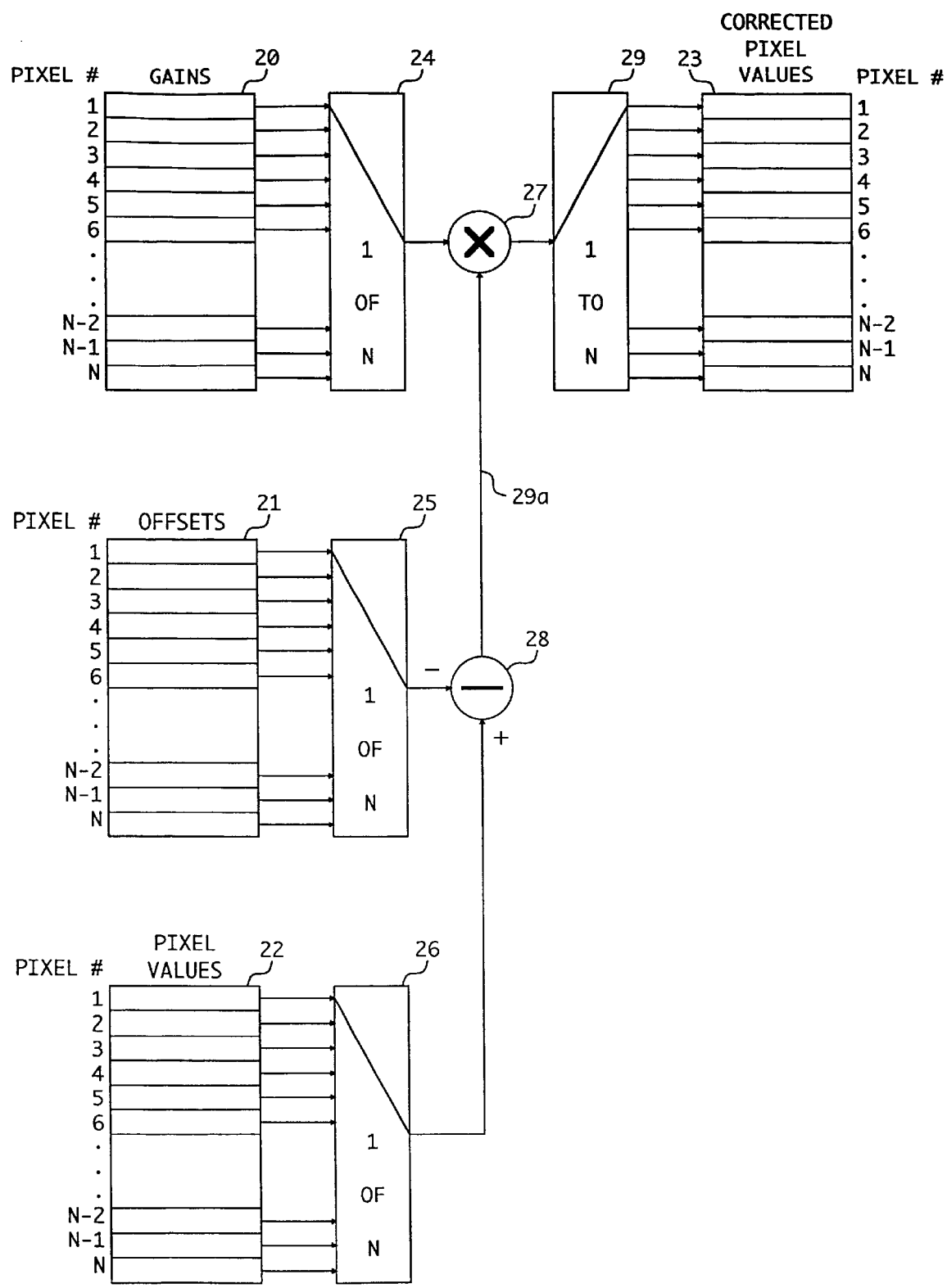
FIG. 2 is a schematic representation of the application of offsets and gains to raw pixel values obtained from the apparatus in FIG. 1 in order to correct for pixel to pixel variations in scanner system response.

FIG. 2 shows schematically the application of gains and offsets in data tables 20 and 21, respectively, on a pixel-by-pixel basis to scanned image pixel values from data table 23 to establish corrected image pixel values in data table 24. These tables of pixel values, gains, and offsets are stored in memory 19 (FIG. 1). The process of sequentially selecting pixels for operation (represented by the 1 OF N blocks 24–26), of applying the offset and gain values (represented by the - and X circles 27 and 28), and of storing the results away on a pixel-by-pixel basis (represented by the 1 TO N block 29) is carried out under control of a software program in known manner. Offset values are typically determined by turning off the illumination source (either with a shutter or by electrically turning off the light source) and collecting scan data. These non-zero values are then subtracted from subsequent sets of pixel values in order to make the dark point of the pixel values equal to zero. Gain values are determined by scanning with the illumination source turned on, collecting scan data, and applying the offsets. Since, for each pixel, the gains are determined by inverting the offset corrected scan data, the multiplication for each pixel of the offset corrected scan data on line 29a with its associated gain from table 20 will equal one for every pixel, and the resulting system response will be uniform.

Figure 3A:
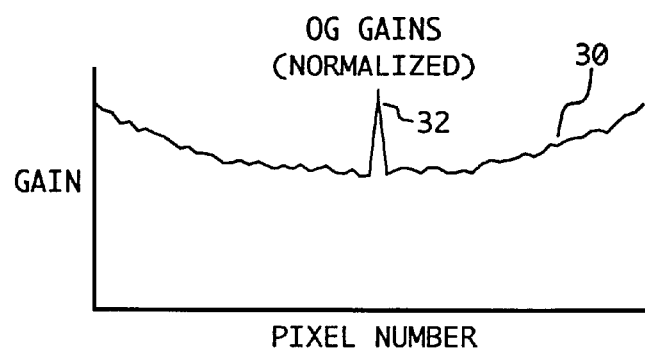
FIG. 3 is a graph of gains derived by scanning without film present (OG Gains, FIG. 3A), a graph of gains derived by scanning through minimum density film (Dmin Gains, FIG. 3B), and a graph of gains which is a composite of the OG Gains and Dmin Gains which provides better correction than either original set of gains (Composite Gains, FIG. 3C)
Figure 3B:
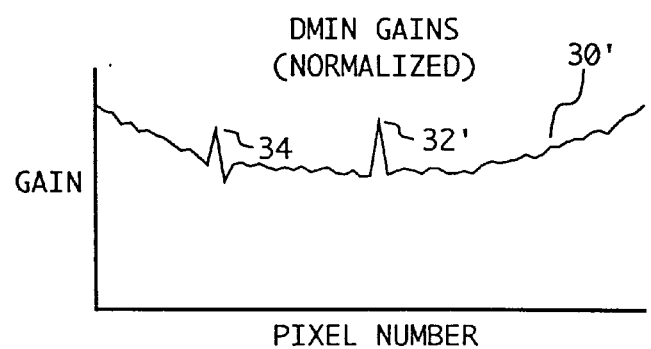

The gain values may be determined by collecting scan data with no film present (a so-called open gate condition), adjusting the signal level to approximate the Dmin condition or some other arbitrary signal level condition by a number of means including reducing the illumination level, reducing the integration time of the imager, reducing the gain of the output amplifier, or dividing the digital data from the A/D converter by some constant. FIG. 3A shows a set of gains 30 derived from open gate scan data (normalized by one or more of the methods described above to be consistent with Dmin scan data or with some arbitrary signal level). In this figure there is shown a narrow, sharp non-uniformity 32, which results from some obstruction of light in the illumination source, perhaps due to a piece of dirt or a fiber adhered to the end of the light diffuser or elsewhere in the optical path from the illumination source. The gain values may also be determined by collecting scan data with minimum density film present (the Dmin condition). Dmin areas of the film are typically present in the leader and trailer of Advanced Photographic System (APS) film. FIG. 3B shows a set of gains 30' derived (with the same illumination as in FIG. 3A) from Dmin scan data (normalized, if necessary, to the same overall signal level represented by FIG. 3A). In this FIG. 3B, there is the illumination non-uniformity 32' corresponding to non-uniformity 30 of FIG. 3A, and a new perturbation 34 which is due to some localized imperfection in the Dmin area of the film from which the scan data was collected. This latter imperfection may be a scratch, dirt, or mark on the film. Note that because the presence of film changes the characteristics of the scanning system, Dmin non-uniformity 32' is actually smaller than the open gate non-uniformity 32 while the broad illumination non-uniformities are generally the same as between open gate and Dmin gains. If the open gate gains are used for correcting variations in image scanning system response, the difference between 32' and 32 manifests itself as an error in correction which shows up as a streak in the resulting corrected image. Hence, using open gate gains alone leads to errors in correction.

Although gains derived by scanning through Dmin (such as the leader of APS film) correct for localized, narrow, sharp non-uniformities (such as 32' in FIG. 3B), there is a potential for introducing streaks in the resulting gain corrected images due to the localized scratches, dirt, marks, or other imperfections being only in the part of the film used to determine the gains, as shown by 34 in FIG. 3B, but not in the image areas. Hence, using Dmin derived gains alone also lead to errors in correction. However, it may be acceptable to use Dmin derived gains only in the areas where open gate derived gains are in error, specifically in the vicinity of narrow, sharp non-uniformities in the open gate gains. In this case, the pixel-by-pixel gain values for a given line scan would be derived mostly from an open gate scan in order to capture the broad illumination profile and pixel-by-pixel non-uniformities in the imaging device. The open gate gain values would then be replaced by Dmin derived gain values in those areas of narrow, sharp non-uniformities which are most probably due to illumination source contaminants (dust or small particles molded into the illumination diffuser, for example). Thus, by deriving a composite gain profile from appropriate, selective combinations of the open gate and Dmin gain profile values, more accurate Dmin gains are used in pixel areas where the differences between open gate and Dmin are largest so as to adjust optimally for narrow illuminant source anomalies, and open gate gains are used everywhere else in the scan in order to minimize the susceptibility to dirt, scratches, and other localized imperfections in the Dmin portion of the film from which the Dmin gains were derived.

Figure 3C:
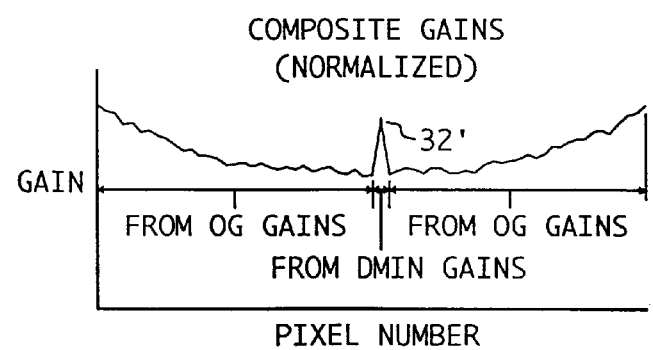

The open gate and Dmin gains are preferably normalized so that they are, on average, the same. This can be accomplished, for example, by dividing the open gate gain for each pixel by the average of all the open gate gains, and then multiplying the result by the average of all the Dmin gains. Such a set of composite gains is shown in FIG. 3C. This figure also shows the broad pixel ranges adjusted by the open gate gain values (OG) of the composite gain profile and the narrow pixel range adjusted by the Dmin gain values (Dmin) in the composite gain profile.

The invention, as just described in the context of an embodiment in which a composite set of gain data derived from a binary selection of either open gate and Dmin gain data may be may be more broadly considered in terms of establishing the composite gain profile by proportionally mixing open gate and Dmin gains depending on a pixel-by-pixel variable K used to set proportional amounts of the Dmin and open gate gain values to constitute the pixel-by-pixel composite gain profile values, as follows:

$$G = KG_{DM} + (1-K)G_{OG} \quad (1)$$

where:

G is the composite gain value, $G_{OG}$ is the open gate gain, $G_{DM}$ is the Dmin gain, and K is a determinable proportionality factor having a determinable value from zero through one which determines the proportionate contributions of the two gain values $G_{OG}$ and $G_{DM}$ to the pixel-by-pixel composite gain value.

Figure 4:
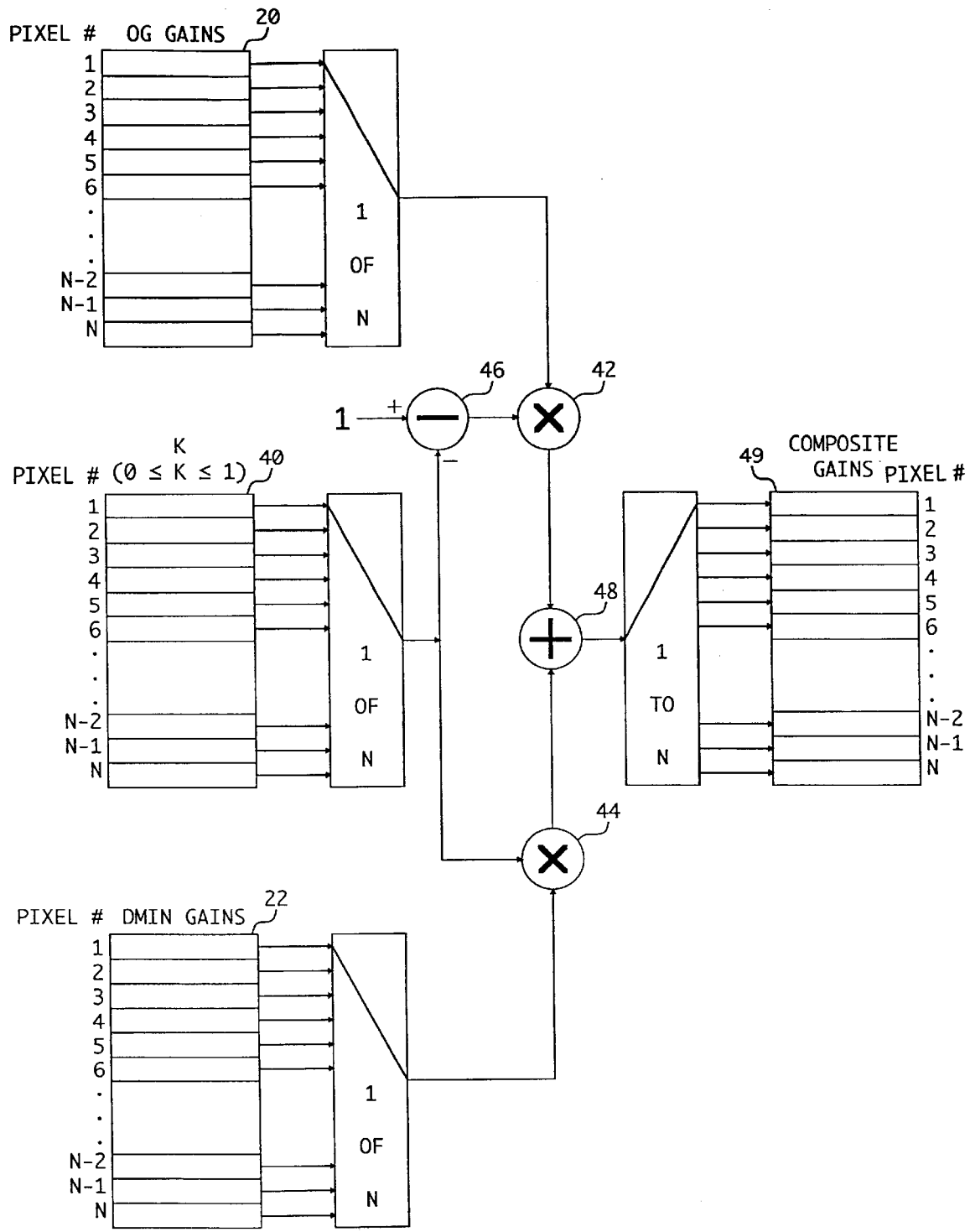
FIG. 4 is a schematic representation of a method for proportionally combining open gate gains and Dmin gains to derive a composite set of gains.

This method of proportionally combining the two sets of gains is shown schematically in FIG. 4 in which the blocks shown serve purposes equivalent to similar blocks in FIG. 2. Thus, output gains in data table 20 and Dmin gains in data table 22 are input to multipliers 42 and 44, respectively. A data table 40 of proportionality K factors provides inputs directly to multiplier 44 and via a subtractor 46 to derive the variable (1−K) applied to multiplier 42. The outputs of the two multipliers are then added at 48 to create the composite gain profile values for the composite gain profile data table 49.

The set of proportionalities K can be derived in a variety of ways. For example, the set of open gate gains can be operated upon by a discriminating function 50 in order to create the set K as is shown schematically in FIG. 5A. The discriminating function can be a high pass filter which identifies narrow, sharp non-uniformities in the open gate profile. Alternatively, both the open gate gains and the Dmin gains can be operated upon together by a discriminating function 52 in order to create the set K as shown schematically in FIG. 5B. The discriminating function 52 in this case can compare the rates of change between open gate and Dmin gains. Where the rates of change are substantially the same (as in the overall profile and at points 32 and 32') the difference between open gate and Dmin provides K, and where the rates of changes are substantially different (as at point 34 in the Dmin data and the corresponding non-perturbed point in the open gate data) K is set to zero to select exclusively from the open gate data.

Figure 5A:
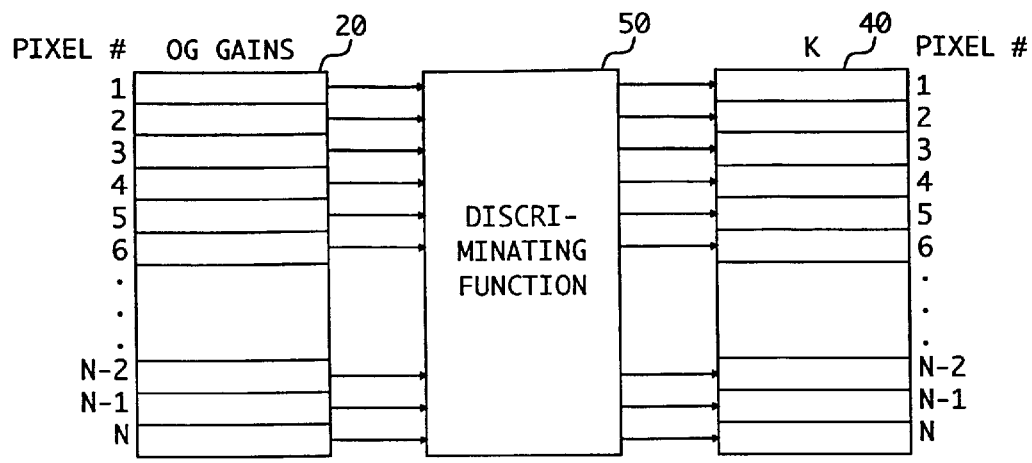
FIG. 5A shows the Ks being derived from the open gate gains and FIG. 5B shows the Ks being derived from both open gate gains and Dmin gains.
Figure 5B:
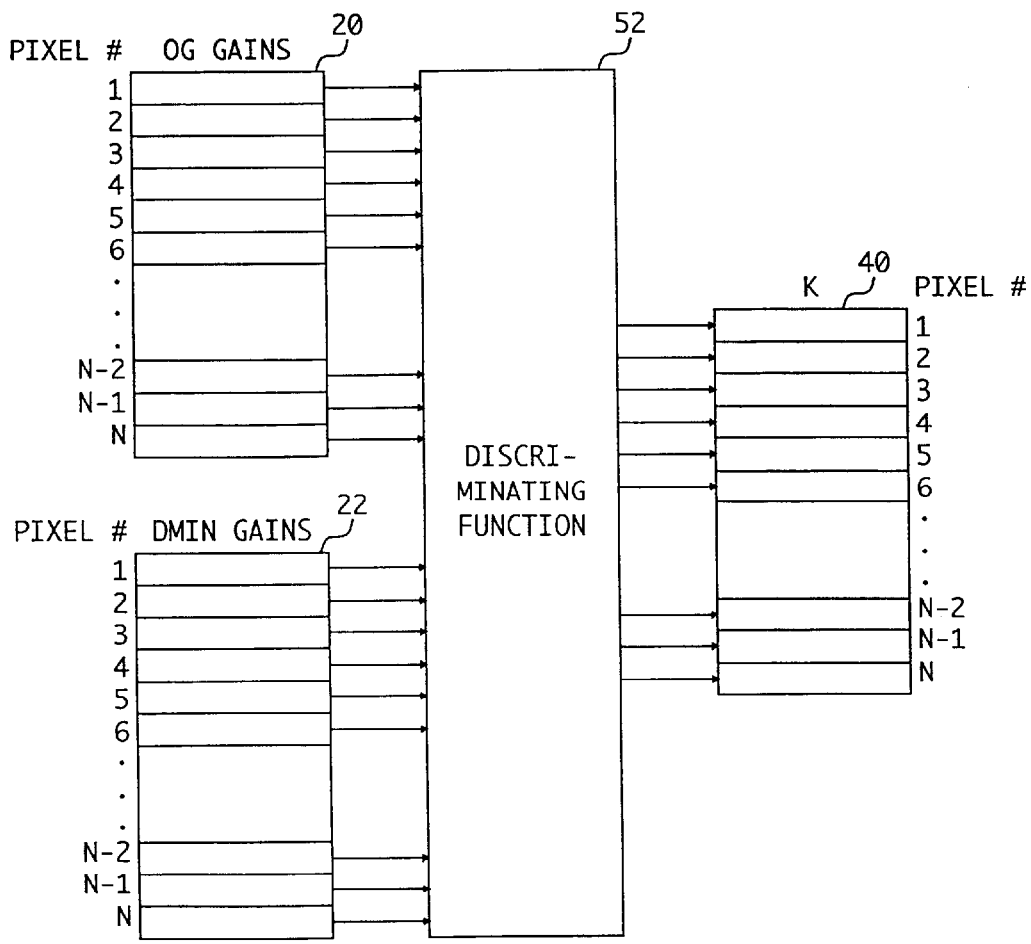

FIGS. 6A–6D show a number of potential discriminating function implementations useful in function 50 of FIG. 5A wherein the discriminating functions operate only on the open gate gains to derive the set of proportionalities K. In the diagrams, the closed boxes represent algorithmic processes and the open sided boxes represent sets of data stored in memory.

Figure 6A:
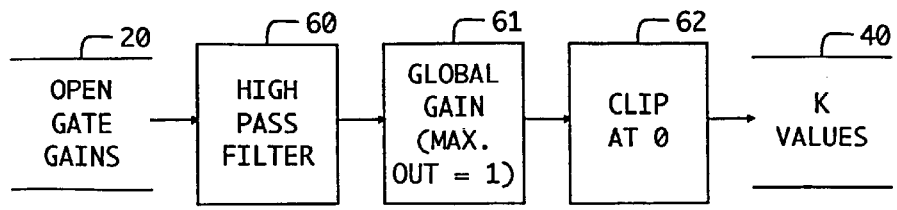
FIG. 6 is a block diagram representation of some candidate discriminating functions for FIG. 5A: a high pass filter (FIG. 6A), a high pass filter with clipping (FIG. 6B), a high pass filter with absolute value and clipping (FIG. 6C), and a high pass filter with absolute value, offset, and clipping (FIG. 6D)

FIG. 6A shows a high pass filter 60 operating upon the open gate gains from table 20. It should be understood that, in this context, "high pass filter" is any linear or non-linear function which detects fluctuations in the gain values which meet a given criterion for sharpness. The result of the high pass filter is gained in gain block 61 so that the maximum output value is equal to one. The result of the gain block 61 is then clipped at zero in block 62 to eliminate any negative values. In this case, the highest sharp non-uniformity (in a high pass sense) will select exclusively the Dmin gain, broad non-uniformities will select exclusively the open gate gain, and non-uniformities in between these two extremes will select a proportion of both Dmin and open gate gains. This ensures that the transition between open gate derived gains and Dmin derived gains will be smooth.

Figure 6B:
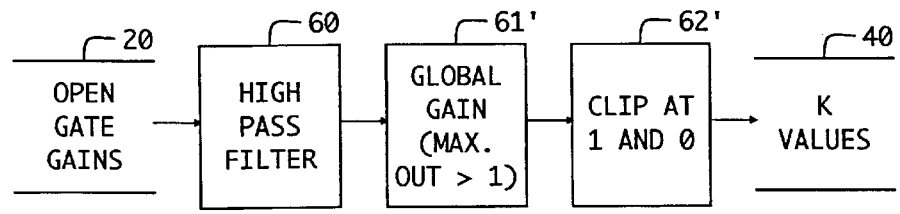
Figure 6C:
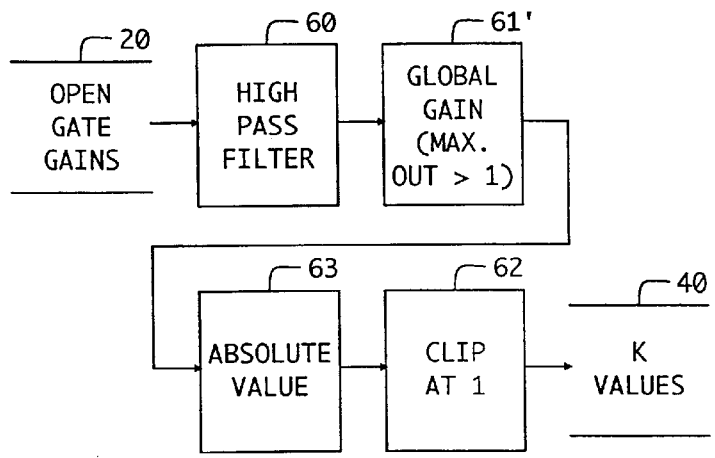
Figure 6D:
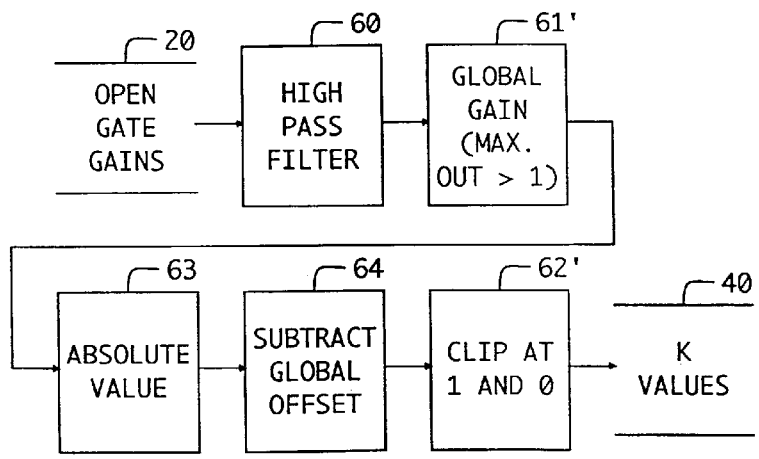

FIG. 6B again shows the high pass filter 60 but a modified gain block 61' in which the gain is set so that the maximum output value is greater than one. This output from block 61' is then clipped in block 62' to zero to eliminate negative numbers and to a value of one at the upper end. In this embodiment, more of the sharp non-uniformity gain corrections will be selected from the Dmin gains, not for just the highest sharp non-uniformity correction. In FIG. 6C, the process of FIG. 6B is further modified by taking the absolute value of the output of the gain block 61' in order to eliminate negative values prior to the clipping block 62" in which the higher values are clipped to a value of one. This has the effect of tending to select the Dmin values for negative values of the high pass output. This is useful since such negative values are likely to occur in the transition region between a sharp non-uniformity and the broader gain profile and such transition regions are have been found to be better corrected by the Dmin gains. FIG. 6D shows a modification to FIG. 6C in which a global offset is subtracted in block 64 from the result of the absolute value process in block 63 and prior to the max=1 and min=0 clipping process of block 62'. This has the effect of increasing the regions in which the open gate gain will be exclusively selected and it also makes the transition from exclusively open gate to exclusively Dmin somewhat steeper.

Figure 7:
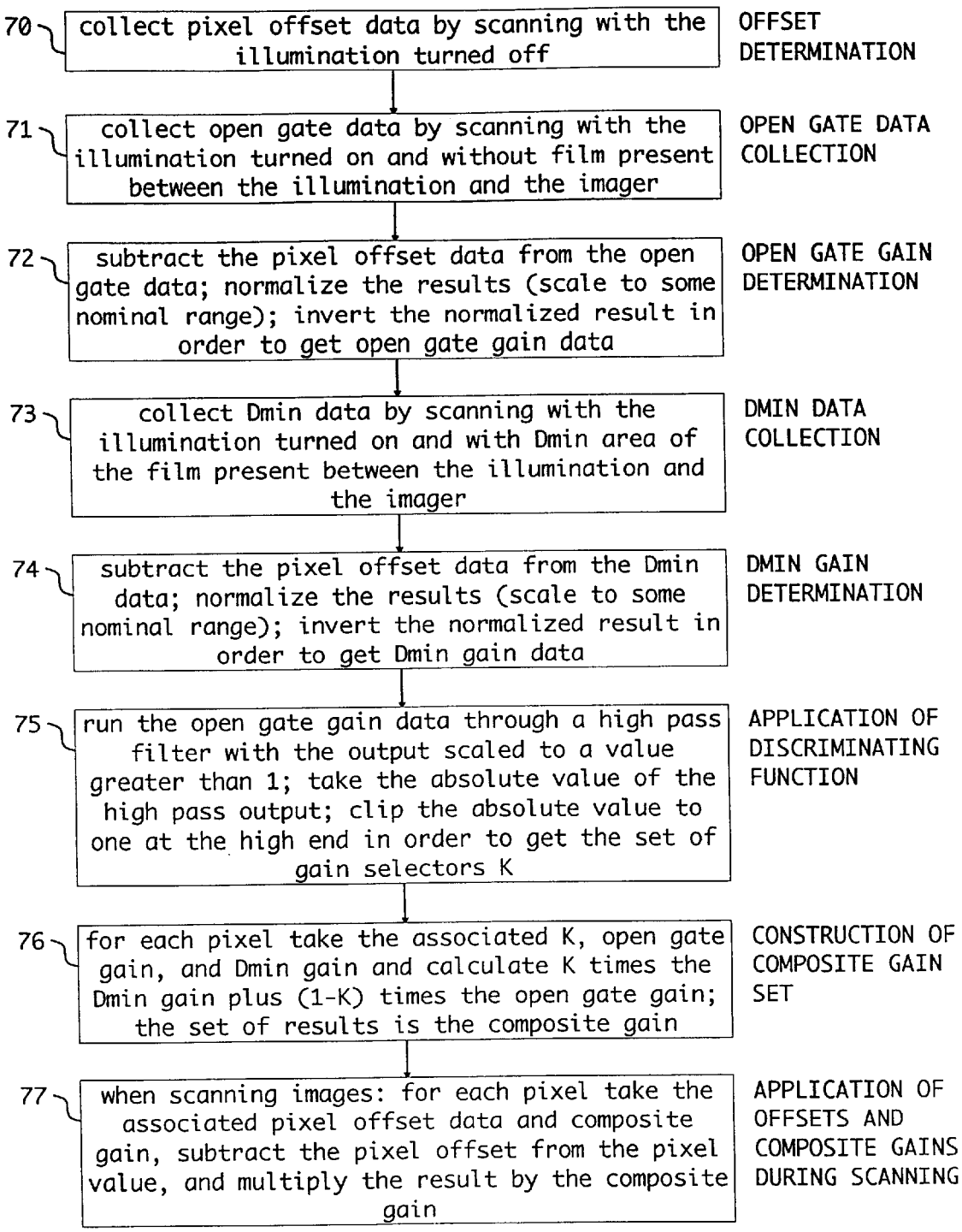
FIG. 7 is a step by step description of the process of determining open gate gains, Dmin gains, creating a composite set of gains, and applying the composite set of gains.

FIG. 7 illustrates in a step by step fashion the process of determining offsets and gains which can be implemented by suitable programming of the indicated steps in a computer. In step 70, offset values for each of the pixels are determined by scanning with illumination turned off. In step 71, maximum scanned system output values are determined preferably by scanning with the illumination turned on and without film present between the illumination and the imager. In step 72, the open gate profile is determined by subtracting for each pixel the offset data from the open gate data. The results are normalized by scaling to a suitable range and the normalized results are then inverted in order to obtain the open gate gain data. In step 73 Dmin data is collected pixel by pixel by scanning the suitable Dmin area of the film such as the leader. In step 74, Dmin gain profile is determined in the same manner as open gate profile is determined in step 72. In step 75, one of the discriminating functions previously described is applied. This is done, for example using the discriminating function of FIG. 6C, by running the open gate gain data derived in step 72 through a suitable high pass filter with the output scaled to a value greater than one. The absolute value of the high pass output is then taken and the absolute value is then clipped to a value of one at the high end in order to arrive at the desired set of gain selectors K. Step 76 then operates to construct the desired composite gain profile set by application of equation 1 as shown schematically in FIG. 4. Once the composite gain profile set is determined in step 76, step 77 operates during normal image scanning to apply the offsets and the derived composite gain values to achieve the desired improved image scanning results. It will be appreciated that while the discrimination function of FIG. 6C. is described, any of the discriminating functions shown in FIGS. 6A–6D may be employed in step 75.

Although the discussion to this point has dealt with discriminating functions which operate on the open gate gains in order to determine a set of proportionalities K, or perhaps which operate jointly on the open gate and the Dmin gains in order to determine K, other means of determining K can also be used. For example, the proportionalities K can be made to select more from the Dmin gains and less from the open gate gains as the scan moves from the middle pixels to the outer pixels. The rationale for doing this would be to correct for the fact that rays of light to the middle pixels go through a smaller thickness of film than rays of light to the outer pixels. A quick consideration of the angles of light involved demonstrates why this is so. Hence, the density of the film will cause a falloff of light which is greater when film is present than in the open gate condition. In this case, the proportionalities K are strictly a function of pixel position.

The discussion to this point has dealt primarily with proportionally combining the open gate and Dmin gains. Other ways of combining the open gate and Dmin gains may be considered. For example, if the introduction of the film into the system exacerbates a flare condition due to internal reflections between the scanner system and the surface of the film, and if the flare condition manifests itself repeatedly at certain pixel locations, it may be advantageous to select exclusively from the Dmin gains at those pixels locations. Open gate gains may be selected elsewhere, or the open gate and Dmin gains may be combined as previously described for other pixel locations.

Note that, since the gain is essentially the inverse of the offset corrected open gate or Dmin signal, all of these techniques would apply equally to the offset corrected open gate and Dmin signals themselves as well as to the gains derived therefrom.

It will be appreciated also that, although this calibration technique has been described in the context of a negative photographic film scanner, the techniques are applicable also to other types of image scanners such as a positive transparency scanner or a reflection print scanner.

The invention has been described in detail with particular reference to certain preferred embodiments thereof, but it will be understood that variations and modifications can be effected within the spirit and scope of the invention.

What is claimed is:

1. A method of performing gain calibration in a film scanner to correct for pixel-by-pixel variations in scanning system response comprising:

a. obtaining a pixel-by-pixel open gate response for the scanning system in which scanning illumination is active but without film present in the scanning system;

b. establishing a pixel-by-pixel open gate gain profile in response to said open gate response;

c. obtaining a pixel-by-pixel Dmin response for the scanning system in which scanning illumination is active and film is present in the scanning system;

d. establishing a pixel-by-pixel Dmin gain profile in response to said Dmin response e. establishing a pixel-by-pixel composite gain profile from selective combination of said open gate and Dmin gain profiles; and f. on a pixel-by-pixel basis, utilizing the composite gain profile for actual scanning of film images.

2. A film scanner as described in claim 1, in which the composite gains are determined by taking proportional amounts from the open gate gains and the Dmin gains on a pixel-by-pixel basis as follows:

$$G = K G_{DM} + (1-K) G_{OG}$$

where G is the composite gain, $G_{OG}$ is the open gate gain, $G_{DM}$ is the Dmin gain, and K selects between the open gate and Dmin gain values and K is a selectable value in a range of from zero through one.

3. A film scanner as described in claim 2, in which the K factor is determined by operating upon the open gate gains with a high pass filter to produce an output result, scaling the output result so maximum output of the high pass filter is one, and clipping the result of the scaling operation to zero so there are no negative numbers.

4. A film scanner as described in claim 2, in which the K is determined by operating upon the open gate gains with a high pass filter to produce an output result, scaling the output result so maximum output of the high pass filter is greater than one, and clipping the result of the scaling operation to zero and one.

5. A film scanner as described in claim 2, in which the K is determined by operating upon the open gate gains with a high pass filter to produce an output result, scaling the output result so maximum output of the high pass filter is greater than one, taking the absolute value of the result of the scaling operation, and clipping the result of the absolute value operation to one.

6. A film scanner as described in claim 2, in which the K is determined by operating upon the open gate gains with a high pass filter to produce an output result, scaling the output result so the maximum output of the high pass filter is greater than one, taking the absolute value of the result of the scaling operation, subtracting an offset value from the result of the absolute value operation, and clipping the result of the subtraction operation to zero and one.

* * * * *